US005841051A

United States Patent [19]

Segan

[11] Patent Number: 5,841,051

[45] Date of Patent: Nov. 24, 1998

[54] APPARATUS FOR PROVIDING MUSICAL INSTRUCTION

[75] Inventor: Marc H. Segan, New York, N.Y.

[73] Assignee: M. H. Segan Limited Partnership, New York, N.Y.

[21] Appl. No.: 516,450

[22] Filed: Aug. 17, 1995

[51] Int. Cl.[6] .......... G09B 15/00

[52] U.S. Cl. .......... 84/477 R; 84/485 R; 84/478

[58] Field of Search .......... 84/477 R, 478, 84/479 A, 485 R, 481, 470 R; 434/362, 323, 365, 227–233

[56] References Cited

U.S. PATENT DOCUMENTS

| | | | |
|---|---|---|---|
| 3,885,490 | 5/1975 | Gullickson | 84/470 |
| 4,040,324 | 8/1977 | Green | 84/478 |
| 4,041,828 | 8/1977 | Leonard | 84/471 R |
| 4,054,079 | 10/1977 | Sohler | 84/423 |
| 4,061,072 | 12/1977 | del Castillo | 84/478 |
| 4,203,345 | 5/1980 | Collin et al. | 84/478 |
| 4,465,477 | 8/1984 | AvGavaar | 434/233 |
| 4,480,521 | 11/1984 | Schmoyer | 84/1.28 |
| 4,516,465 | 5/1985 | Kani | 84/470 R |
| 4,559,861 | 12/1985 | Patty et al. | 84/470 R |
| 4,690,644 | 9/1987 | Flanders et al. | 434/158 |
| 4,902,231 | 2/1990 | Freer | 434/227 |
| 5,011,412 | 4/1991 | Rosenberg | 434/227 |
| 5,107,743 | 4/1992 | Decker | 84/478 |
| 5,214,231 | 5/1993 | Ernst et al. | 84/652 |
| 5,392,682 | 2/1995 | McCartney-Hoy | 84/470 R |

OTHER PUBLICATIONS

VTech, Little Smart Magic Keys User Manual, From product purchased befor Aug. 17, 1995, pp. 1–23.

*Primary Examiner*—Michael L. Gellner
*Assistant Examiner*—Shih-yung Hsieh
*Attorney, Agent, or Firm*—Cohen, Pontani, Lieberman & Pavane

[57] ABSTRACT

The preferred embodiment provides an electronic learning aid which includes a housing having a hand pad that is sized and shaped to receive a child's hand. The hand pad has five finger portions with each having a finger switch embedded therein that is positioned to be actuated by the child's finger. An indicator is mounted in close proximity to and associated with each finger portion to indicate the appropriate finger to be depressed on the hand pad. A keyboard assembly, having an abbreviated keyboard, is also mounted on the housing. A light emitting diode is mounted directly beneath each white key so that each white key can be illuminated to indicate the appropriate key to be depressed. A microcomputer having a speech synthesizer provides instruction to the student and controls the operation of the electronic learning aid.

17 Claims, 8 Drawing Sheets

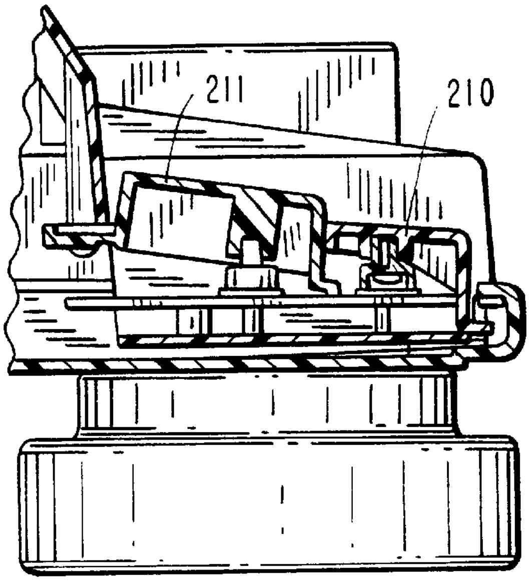
FIG. 1D
FIG. 3
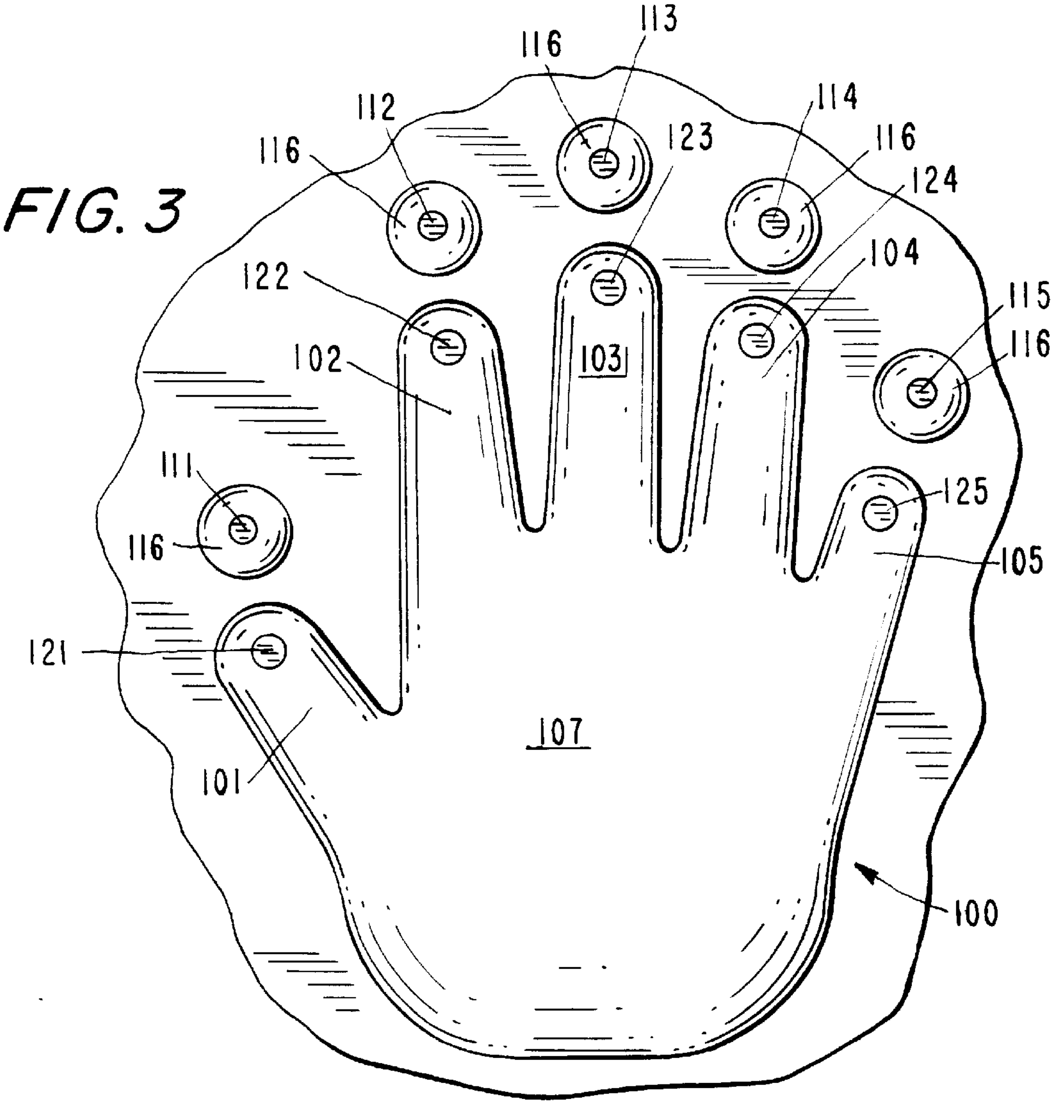

APPARATUS FOR PROVIDING MUSICAL INSTRUCTION

BACKGROUND OF THE INVENTION

The present invention relates generally to a system and method for instruction in the operation of a keyboard musical instrument and specifically to a system that provides instruction as to the correct key fingering and key selection of a keyboard musical instrument such as a piano, organ, or reed-organ.

Most people typically require a great deal of training to learn to play a keyboard instrument. Most young children, however, have a very short attention span which makes lengthy lessons and practice sessions very difficult for most children to endure. In addition, young children often do not have the hand dexterity to perform the key manipulations required for proficient playing. Furthermore, as young children normally do not have any previous musical education or experience, they are also hampered by not knowing how to read musical notes. In summary, instruction of keyboard musical instruments is often very frustrating for both the adult instructor and child student.

Several devices that provide instruction in the playing of keyboard musical instruments have been proposed that provide solutions to some of these problems. U.S. Pat. No. 5,107,743 to Decker discloses a piano teaching device having a panel designed to fit over the keys of an existing keyboard so that lights mounted on the panel are located directly above the piano keys. The lights illuminate to indicate the appropriate keys to be depressed and have more than one color to indicate the hand the user will use to depress the keys (e.g., red for the left hand and green for the right hand). A card, which provides data corresponding to a song to be played, is inserted into a card reader and the speed of the song is controlled by the user with a foot pedal. The device disclosed in Decker has the ability to indirectly indicate proper finger placement by illuminating indicators in a third color to indicate the position of the thumb on one side and little finger on the other side from the keys to be played. Although this device provides instruction as to fingering, this instruction is more suitable for adults who can more quickly identify the appropriate finger to be used based on the position of the thumb and little finger. Furthermore, this device provides no detection or feedback as to the correct finger placement.

Another device disclosed in U.S. Pat. No. 4,480,521 to Schmoyer instructs the student in the proper fingering for chord triads on an organ or piano. Indicators on a hand display illuminate to indicate the proper fingers for use in playing the chord. In addition, a number (indicating the appropriate finger) is illuminated on the keys of a keyboard display to indicate the proper finger placement and key selection. However, the invention described in Schmoyer does not provide feedback or reinforcement as to finger placement.

SUMMARY OF THE INVENTION

The drawbacks of the prior art are overcome by the method and apparatus of the invention. The preferred embodiment provides an electronic learning aid which includes a housing having a hand pad that is sized an shaped to receive a child's hand. The hand pad has five finger portions with each having a finger switch embedded therein that is positioned to be actuated by the child's finger. An indicator is mounted in close proximity to and associated with each finger portion to indicate the appropriate finger to be depressed on the hand pad. A keyboard assembly, having an abbreviated keyboard, is also mounted on the housing. A light emitting diode is mounted directly beneath each white key so that that each white key can be illuminated to indicate the appropriate key to be depressed. A microcomputer having a speech synthesizer controls the operation of the electronic learning aid and provides instructions to the student.

The electronic learning aid has a number of modes of operation. For beginners, the electronic learning aid instructs the child to use the hand pad and to depress the finger that is associated with the illuminated indicator. This exercise enhances hand dexterity and allows the child to associate a number from one through five with each finger. Gradually, the exercises become more difficult until the child is depressing the same fingers that are necessary to play a song. When the child successfully completes these exercises, he is instructed to move to the keyboard and to depress the illuminated keys with the appropriate finger as instructed. Throughout the instruction, the electronic learning aid provides verbal reinforcement as to the correctness or incorrectness of the child's response.

BRIEF DESCRIPTION OF THE DRAWINGS

FIG. 1D is a partial cross sectional view of the electronic learning aid of FIG. 1A taken along line IC—IC with the keys depressed.

FIG. 3 is a plan view of the hand pad of the electronic learning aid of FIG. 1.

DETAILED DESCRIPTION

Figure 1A:
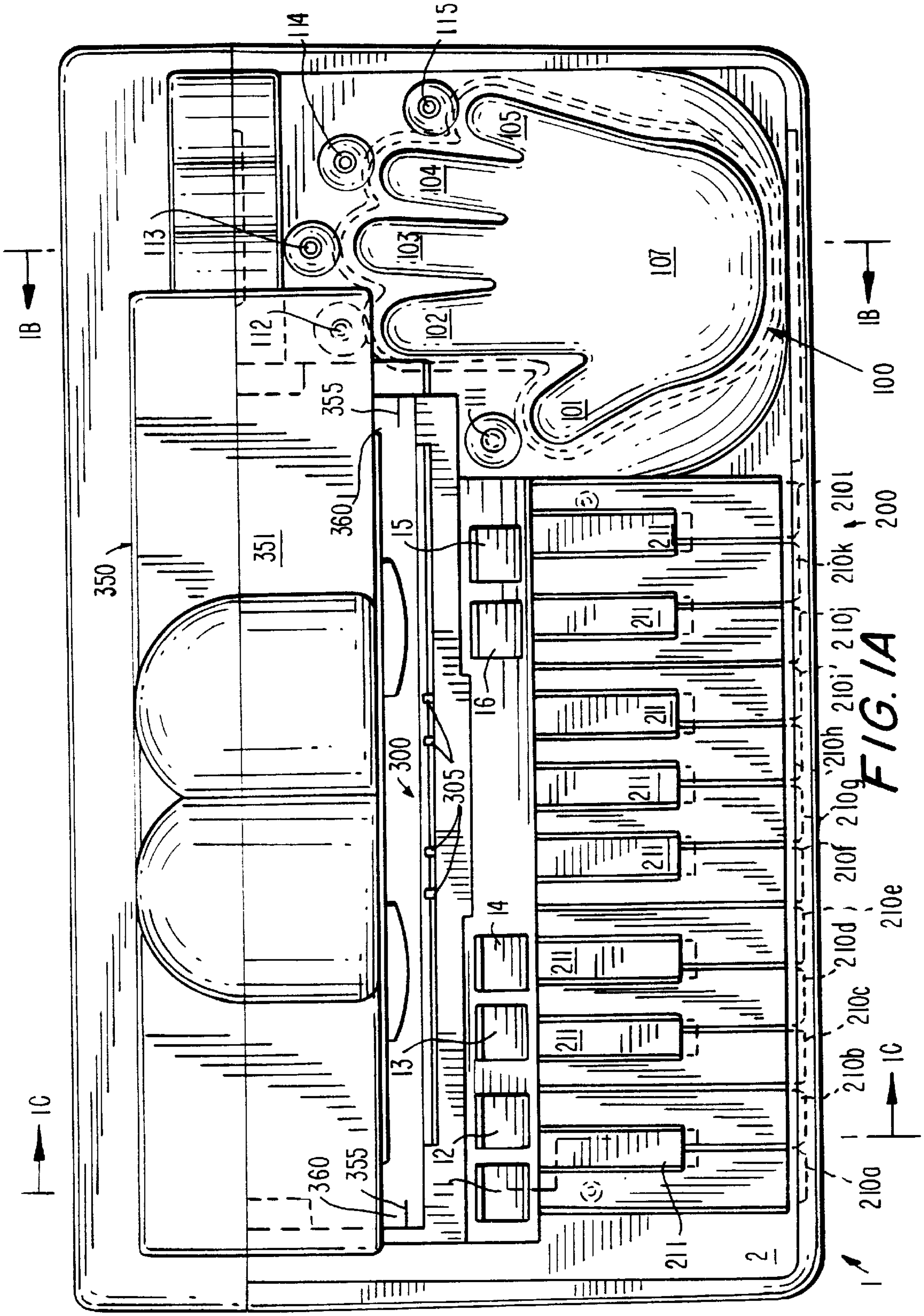
FIG. 1A is plan view of an electronic learning aid employing the principles of the present inventions
Figure 1B:
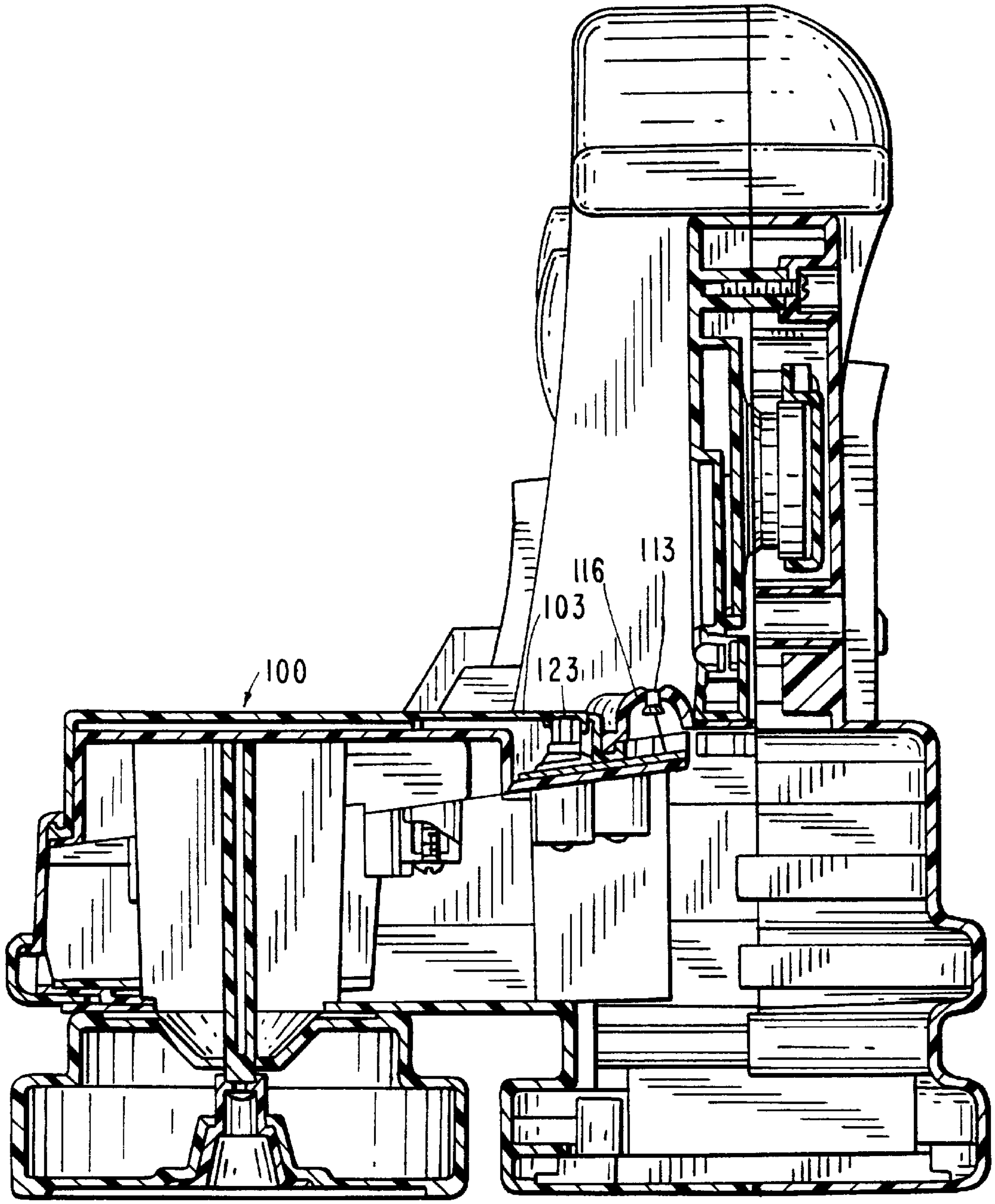
FIG. 1B is a cross sectional view of the electronic learning aid of FIG. 1A taken along line IB—IB.

The preferred embodiment of the present invention is an electronic learning aid, having a speech synthesizer, that provides instruction as to the playing of a piano with an abbreviated keyboard and a hand pad sized and shaped to receive a child's hand. Each key of the keyboard can be selectively illuminated to indicate the appropriate key selection to the child. The hand pad has five finger portions (the thumb being considered a finger throughout this discussion) with each finger portion having a manually actuable finger switch disposed therein. An indicator is disposed in close proximity to each finger portion.

The electronic learning aid begins at an extremely easy level of instruction and provides increasingly difficult tasks. For example, the electronic learning aid begins by having the child place his hand in the hand pad and actuate each finger switch in successive order while providing a visual indication of the switch to be depressed by illuminating each indicator successively. The device also produces an audible output to the child to indicate the finger to be depressed so as to associate a number (from one through five) with each finger. Next, the child will be tasked to actuate each finger switch as the electronic learning aid randomly illuminates each indicator and audibly requests the child to depress the finger switch (by audibly producing the corresponding finger numbers one through five). These exercises develop hand dexterity in the child and provide reinforcement of the number associated with each finger.

After successfully mastering the previously discussed exercises, the child will be tasked to depress the finger switches as each associated indicator is illuminated. The electronic learning aid will illuminate the indicators of the hand pad so that the child uses each finger in the same sequence as he would if he were playing a particular song on the keyboard. As the child depresses each finger switch, the corresponding note from the selected song is produced to provide audible reinforcement of the finger actuation with the note of the song. In addition, this exercise provides muscle memory of the appropriate fingers to be used for the particular song.

Each subsequent task becomes slightly more difficult with the child moving from the hand pad to the keyboard with the increasing difficulty. The electronic learning aid provides aural and visual instructions and feedback as the child progresses through the various skill levels.

As illustrated in FIGS. 1A–E and FIG. 2, the preferred embodiment of the present invention, an electronic learning aid 1, includes a housing 2 which has a hand pad 100, a keyboard assembly 200, a card reader 300, and card support 350. A microcomputer 500 (shown schematically in FIG. 4)is disposed in housing 2.

Hand pad 100 is mounted in the front right portion of housing 2 and is sized and shaped to receive a child's right hand. Referring to FIG. 3, hand pad 100 includes a palm portion 107 and five finger portions 101–105. Hand pad 100 is mounted to housing 2 so that the upper surface of palm portion 107 and finger portions 101–105 are slightly higher than the surrounding housing surface. Each finger portion 101–105 includes a manually actuatable finger switch 121–125 positioned near the end of the respective finger portion 101–105 for actuation by the child's finger tip and can be any suitable conventional switch. As shown best in FIG. 1B, finger portion 103, as well as the other finger portions 101,102, 104, and 105, pivots with respect to palm portion 107 at a living hinge to actuate finger switch 123. Hand pad 100 (palm portion 107 and finger portions 101–105) is formed from molded plastic and is overlaid with a vinyl protective covering.

Five finger indicators 111–115 are mounted on housing 2 with one being positioned near the end of each of five finger portions 101–105 of hand pad 100. Each finger indicator 111–115 is mounted in an indicator housing 116 so that the indicator is positioned above the surrounding surface of housing 2. By mounting indicators 111–115 in a pronounced position up off the surface of housing 2, indicators 111–115 are not obstructed by the child's hand which rests on upraised hand pad 100 during use. Indicators 111–115 of the preferred embodiment are Light Emitting Diodes (LEDs), but could be any suitable visual indicator.

Figure 1C:
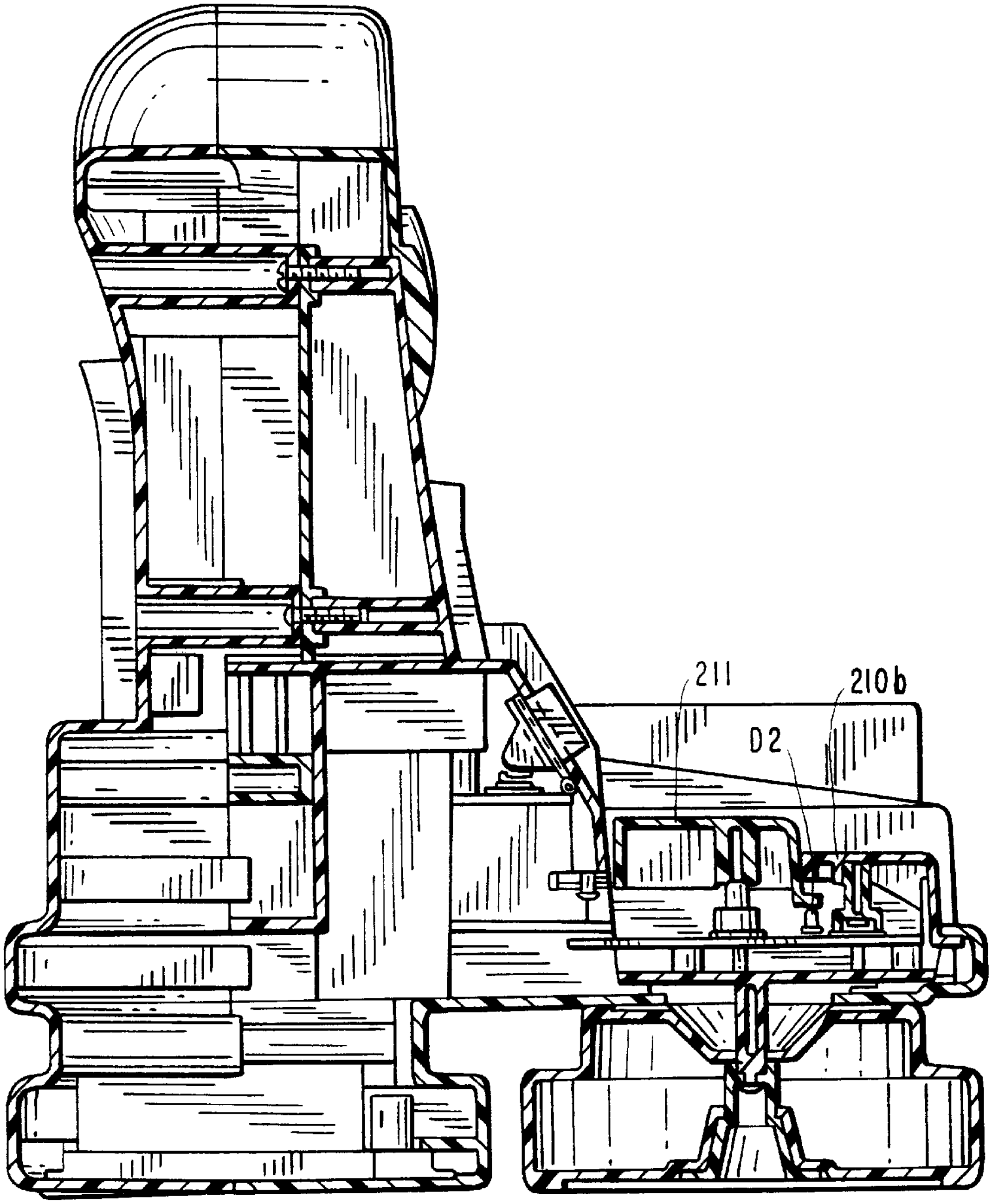
FIG. 1C is a cross sectional view of the electronic learning aid of FIG. 1A taken along line IC—IC.
Figure 1E:
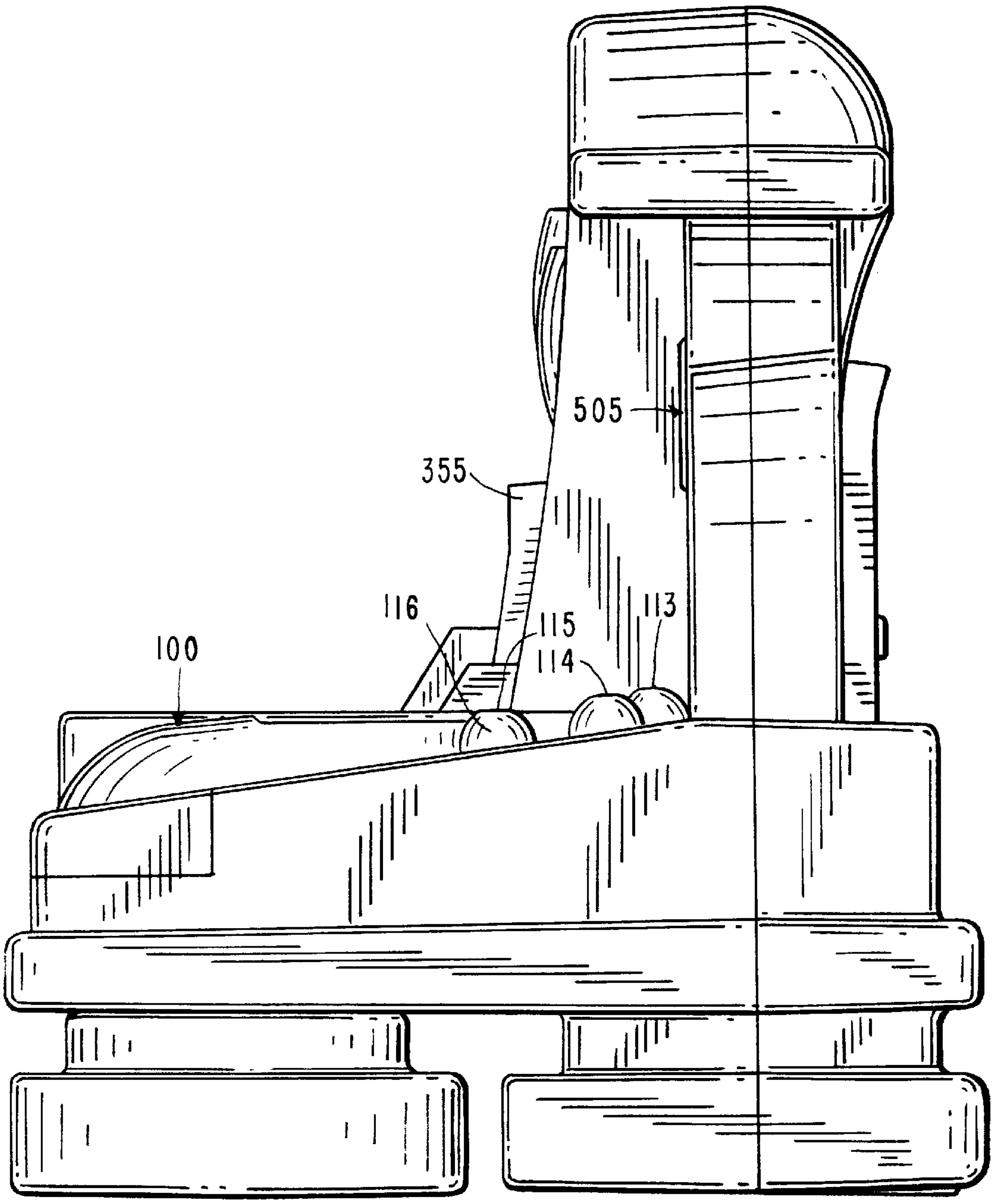
FIG. 1E is a right side view of the electronic learning aid of FIG. 1A.
Figure 2:
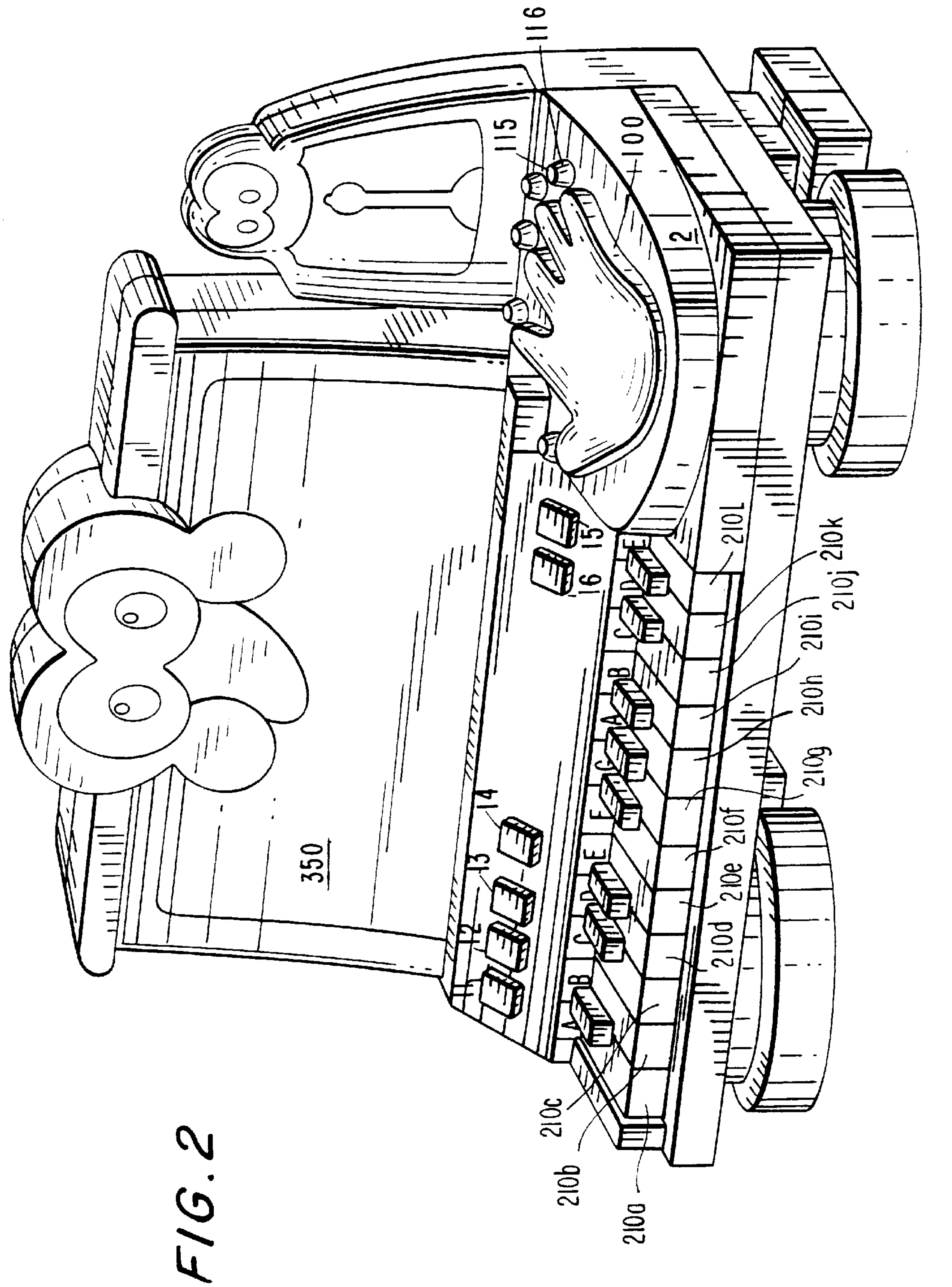
FIG. 2 is a perspective view of the electronic learning aid of FIG. 1.
Figure 4:
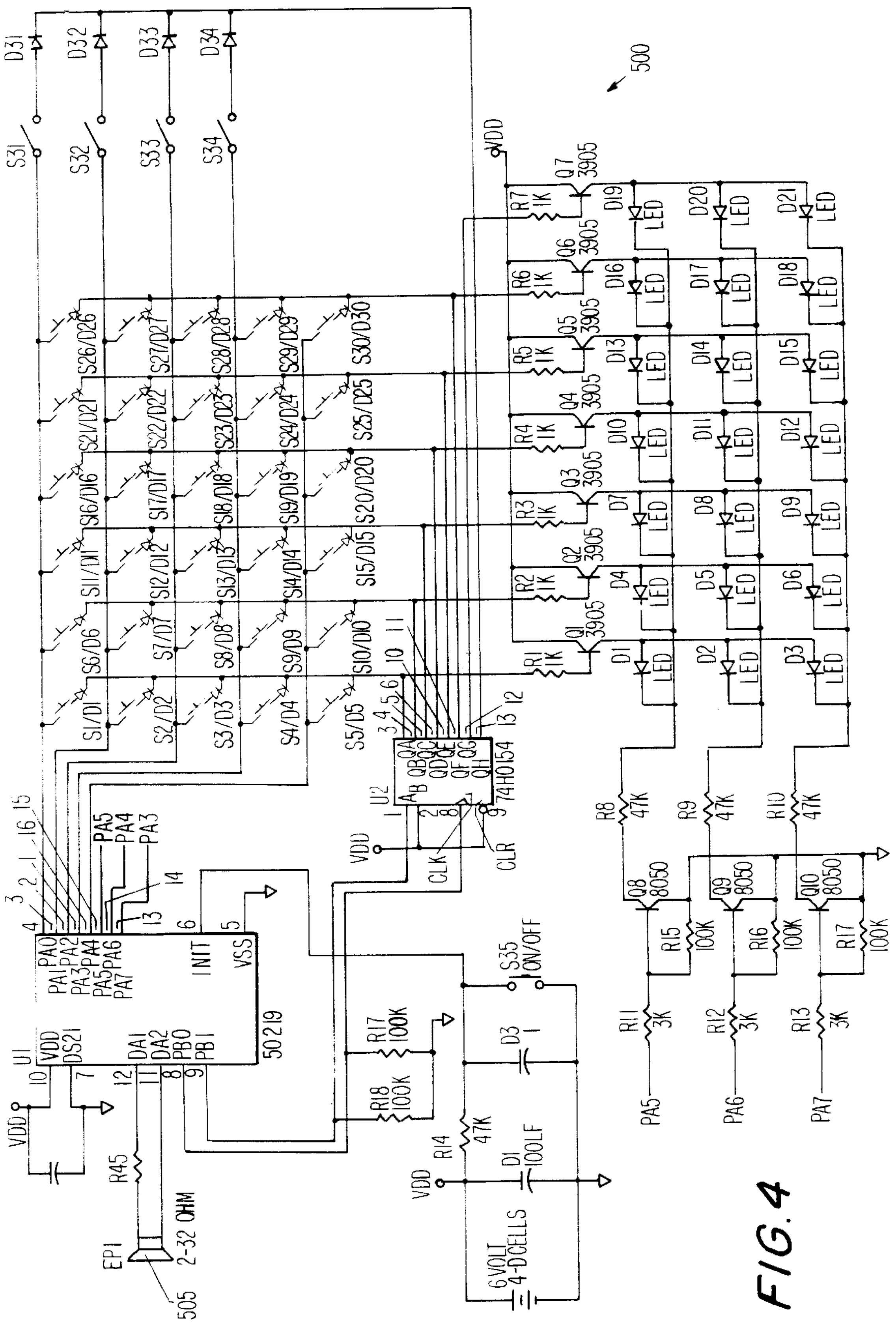
FIG. 4 is a schematic representation of the microcomputer of the electronic learning aid of FIG. 1.

Keyboard assembly 200 includes an abbreviated keyboard having twelve long keys 210*a–l*. Keys 210*a–l* of keyboard assembly 200 are configured in a conventional U.S. keyboard arrangement with key 210*a*, located at the far left of keyboard assembly 200, being an "A" key and key 2101, located at the far right of keyboard assembly 200, being an "E" key. As those skilled in the art of music know, the eight short keys 211 are the sharp and flat keys normally associated with a conventional keyboard. In summary, there are eight short 211 and twelve long keys 210*a–l* for total of twenty keys each of which is actuatable over a range of motion (as shown in FIGS. 1C–D) like that of. Keyboard assembly 200 also includes twelve LEDs D1–D12 (which are schematically represented in FIG. 4) which are mounted on a printed circuit board beneath keys 210*a–l* so that each key 210*a–l* has an associated LED D1–D12 disposed immediately therebeneath as shown in FIG. 1C. Each key 210*a–l* is formed from molded plastic, is somewhat hollow in construction, and is light in color so as to be easily illuminated by its associated LED D1–D12.

Figure 5:
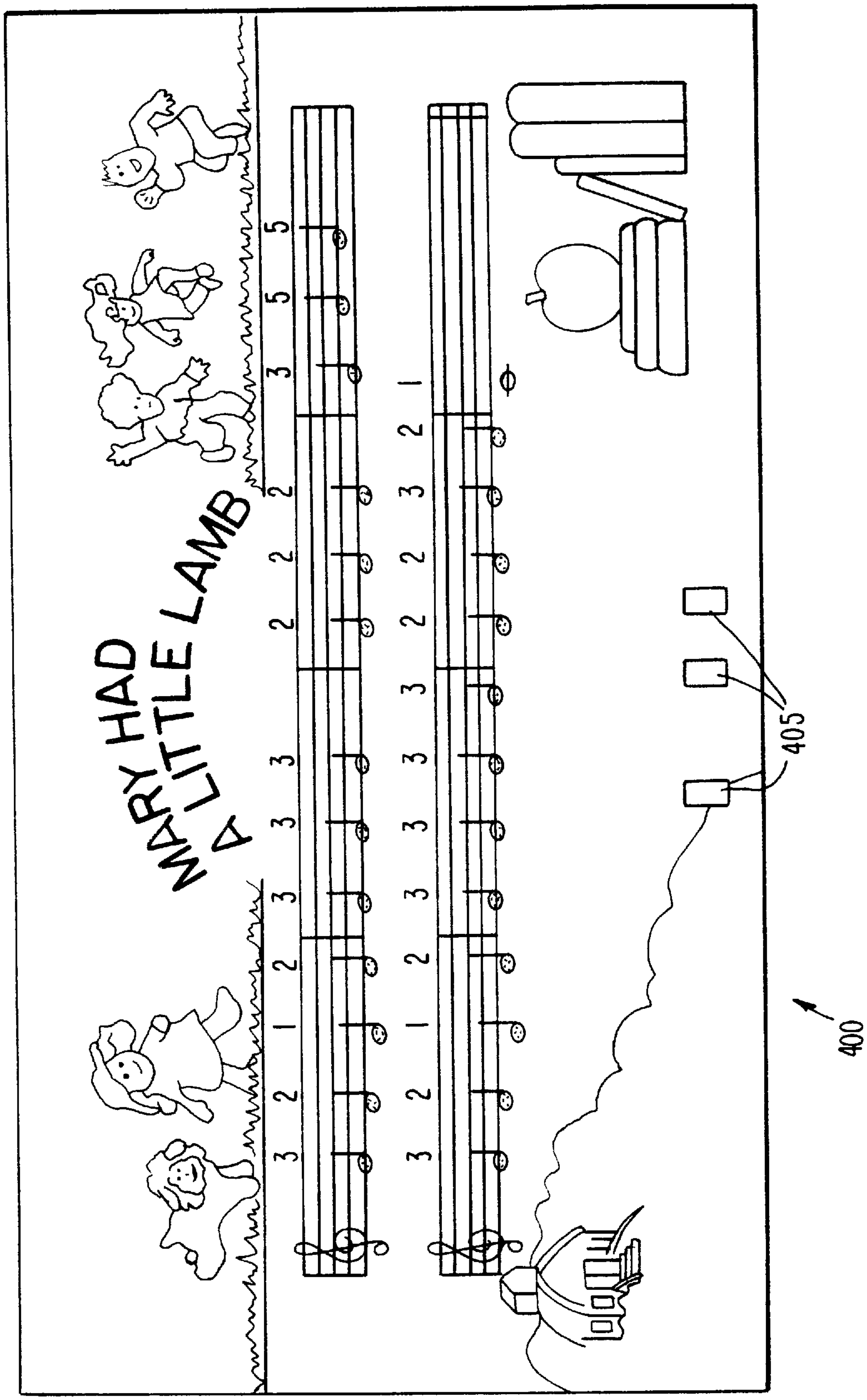
FIG. 5 is a front view of card usable in conjunction with the electronic learning aid of FIG. 1.

Electronic learning aid 1 is provided with cards 400 which are inserted into card slot 360 (described below) on card support 350. Referring to FIG. 5, each card face of each card 400 corresponds to a song and has graphic indicia associated with the song and measured music (a staff) illustrating the notes of the song imprinted on the face of the card. A number, corresponding to the finger that should be used to play the note, is printed directly above each note. Each card has two faces, with each face having a unique song and graphic indicia imprinted thereon. Each card 400 includes a unique permutation of punched holes 405 along the middle of the bottom edge of card 400.

Card support 350, which is positioned in the rear portion of housing 2, includes a main support 351 and a pair of card retainers 355 which define a card slot 360. Card slot 360 is sized and shaped to firmly hold an inserted card 400 in place. Card reader 300, which is a conventional card reader having four mechanical fingers 305 in the preferred embodiment, is positioned in front of the base of card support 350 so that mechanical fingers 305 detect the permutation of punched holes 405 along the bottom of card 400 that has been inserted into card slot 360 of card support 350.

Six control buttons 11–16 are mounted to housing 2 and are conventional push actuated switches. Power button 16 toggles electronic learning aid 1 on and off. Control buttons 11–14 are mode buttons which control the mode of operation of electronic learning aid 1 and include a Keys One Mode button 11, a Keys Two Mode button 12, a Player Piano Mode button 13, and a Free Play Mode button 14. Scroll button 15 is also provided to control the identity of the simulated instrument or music source.

Microcomputer 500, which is shown schematically in FIG. 4, includes U1 which is a speech synthesizer chip having the capability of generating intelligible audible speech through speaker 505. A suitable speech synthesizer chip is sold by Texas Instruments, Inc. of Dallas, Tex., as part number TSP50C19. U1 includes programmable ROM which is stores the speech and songs produced by microcomputer 500. Speaker 505 is mounted slightly rearward of hand pad 100 in housing 2. Microcomputer 500 is powered by four C cell batteries which are housed in a battery compartment that opens from the bottom side of housing 2.

Power button 16 is represented schematically by S36, which acts to toggle U1 on and off when actuated. Keys (210*a–l* and 211) are represented by switches S1–S20 with S1 being the far left key 210*a* ("A") and S20 being the far right key 2111 ("E"). Switches S21–S25 represent finger switches 121–125, respectively. Mechanical fingers 305 are represented by switches S31–S34, while control buttons 11–15 are represented by switches S26–S30. LEDs D1–D12 are mounted under keys 210*a–l*, respectively. Finger indicators 111–115 are represented schematically by LEDs D13–D17. LEDs D18–D21 are not used in the preferred embodiment, but could be used to construct a metronome in a second embodiment discussed below.

U1 controls the operation of microcomputer 500. To illuminate an LED (D1–D21), the transistor Q8–Q10 corresponding to the row of the selected LED and the transistor Q1–Q7 corresponding to the column of the selected LED are simultaneously turned on. Switches S1–S34 are read by a conventional scanning procedure by U1 , which provides a sequential TTL 5 Volt output on lines PA0 through PA4 so that only one row of switches S1–S34 is supplied with power at a time. During this sequential scanning, U1 constantly monitors the inputs of U2 (which is a conventional shift register), which are connected to the columns of switches S1–S34. Therefore, U1 identifies the switch that is depressed by identifying the column and row of the switch that is allowing a voltage to pass therethrough.

Operation

As discussed above, to turn on electronic learning aid 1 the child depresses power button 16. Microcomputer 500 will then power up and generate synthesized speech which will be produced in audible intelligible form through speaker 505 (for ease of discussion hereinafter "say") and with the words "Hi! Let's play the piano." At this point, electronic learning aid 1 will immediately enter Keys One Mode. If no buttons are depressed for a predetermined period of time, electronic learning aid 1 turns itself off.

In many of the modes discussed below, electronic learning aid 1 provides audible instruction to the child to use a particular finger to depress a key or finger switch. Consequently, each finger of the right hand is represented by a number with the thumb being a one, the index finger a two, the middle finger a three, the ring finger a four, and the little finger a five.

To spare the reader from the tediousness of repetition, a reward phrase which is "said" by electronic learning aid 1 at the successful completion of each task will sometimes be omitted during the discussion below. The reward phrases in the preferred embodiment include the following phrases:

"Good."

"Terrific."

"That sounds great."

"Good job."

"That's great."

Similarly, electronic learning aid 1 uses a number of correction phrases when the child actuates an incorrect switch. In the preferred embodiment, these phrases include:

"Oops, watch the lights."

"Careful, watch the lights."

Finally, to indicate to the child that a new or different task is about to begin, electronic learning aid 1 has a number of transitory phrases which include:

"Let's try something new."

"Let's try the next one."

"Let's learn the next one."

"Let's try this one."

"Let's learn something new."

"Let's try another song." (If appropriate.)

"Let's learn another song." (If appropriate.)

As those educated in music know, the length of time that a note is sounded is very important to the successful production of a musical compilation. With a normal piano keyboard, a note is sounded at the actuation of a key and the note will gradually decay as the energy in the piano string imparted by the key dissipates. The decay of the note will take longer if the key is held down by the user and will occur more quickly if the user releases the key.

As will be discussed in more detail below, the child will be repeatedly instructed to depress a particular finger switch 121–125 or key 210*a–l*. In the preferred embodiment, the note corresponding to finger switch 121–125 or key 210*a–l* will sound for a predetermined duration at which time electronic learning aid 1 will terminate the audible output of the note even if the child has not released finger switch 121–125 or key 210*a–l*. However, if the child releases finger switch 121–125 or key 210*a–l* before the predetermined time has elapsed, electronic learning aid will simulate a normal keyboard by increasing the speed of the decay of the note. The predetermined duration of the notes is arbitrary for the exercises in hand dexterity and finger association. However, when the child is learning a song, each note will have a predetermined duration (e.g., half notes, quarter notes, etc.) that is associated with that particular note of the song.

Keys One Mode

When Keys One Mode button 11 is actuated or after start up, electronic learning aid 1 will enter the Keys One Mode. This mode allows the child to associate each finger with a finger number and a note. Electronic learning aid 1 will begin by saying "Put your hand in mine. Remember, each finger has a number. Your thumb is finger one. Your little finger is finger five. Each time a light is lit, press that finger down. As we play, I'll tell you the finger numbers. Okay, let's go. Follow the lights. Finger one." At this time, microcomputer 500 will illuminate finger indicator 111 to provide a visual indication along with the audible instruction to the child to push his thumb down. When microcomputer 500 detects the actuation of finger switch 121, electronic learning aid 1 will momentarily sound a "C" note through speaker 505, turn off finger indicator 111 and say "Finger two" and illuminate finger indicator 112. Upon the successful actuation of finger switch 122, electronic learning aid 1 will sound a "D" note and move to finger three and so on until reaching finger five while sounding an "E" note for finger three, a "F" for finger four, and a "G" for finger five. After successfully actuating finger switch 125 (corresponding to finger five), electronic learning aid 1 will successively task the child to exercise each finger starting with finger five and descend from finger five down through finger one in this same manner and sounding the same corresponding notes through speaker 505 upon the actuation of the correct finger switch 121–125. After successfully completing this task, electronic learning aid 1 will say "Sets play it again."

The device will then have the child perform the exact same task of depressing each successive finger downward to actuate each successive finger switch 121–125 in both ascending and then descending order. However instead of identifying the appropriate finger to be used as "Finger one" or "Finger two" as described above, electronic learning aid 1 simply says the number corresponding to the finger to be depressed. For example, electronic learning aid 1 would simply say "One, two, three, four, five, five, four, three, two, one" as the child successfully actuates each finger switch 121–125, quickening the pace of instruction. As above, each indicator 111–115 is also illuminated while electronic learning aid 1 says its associated finger number and each note is sounded upon the actuation of correct finger switch 121–125. After successfully completing this task, electronic learning aid 1 will audibly produce a reward phrase such as "Good job." followed by a transitory phrase such as "Let's try something new."

Electronic learning aid 1 will then say "One" and illuminate finger indicator 111. The device will then wait for the actuation of finger switch 121 and then produce a "C" and say "One" again while illuminating finger indicator 111. After the child correctly depresses finger switch 121 again, the device will sound a "C" note and again say "One" and illuminate finger indicator 111. When the child depresses finger switch 121 for the third time, electronic learning aid 1 will produce a "C" and say a reward phrase such as "That's great," followed by "Listen, you repeated the same note." Next, electronic learning aid 1 will move to finger two and say "Two, two, two" while illuminating finger indicator 112. As the child correctly actuates finger switch 122 (corresponding to finger two) in response to each audible prompt, electronic learning aid 1 will sound a "D" note. Electronic learning aid 1 will then move on to finger three and so on up through finger five. After successfully depressing finger five down three times, electronic learning aid 1 will say a reward phrase such as "Terrific," followed by a transitory phrase such as "Let's try the next one."

Electronic learning aid 1 will then similarly task the child to actuate combinations of fingers such as "Two, three, two, three, two, three, two" followed by "Two, four, two, four, two, four, two, four, two" and then "One, five, one, five, one, five, one, five, one." In each of these tasks, electronic learning aid 1 will illuminate the appropriate indicator, await actuation of the appropriate finger switch, and sound the respective note.

After the completion of each these tasks electronic learning aid 1 will provide a reward phrase and say "Let's play a game. Let's play without the lights. I'll tell you the numbers." The device will then say each number "One, two, three, four, five, five, four, three, two, one," without illuminating finger indicators 111–115, but while still awaiting the child's correct response and producing the musical note associated with each finger switch 121–125. Electronic learning aid 1 will then provide a reward phrase and randomly generate ten finger numbers (without using any number more than twice) which are similarly tasked to the child to actuate without the aid of finger indicators 111–115.

After successful completion by the child, the device will task the child to play a song by saying "Let's play Mary Had a Little Lamb. Listen. First, I'll play it." Electronic learning aid 1 will then audibly produce (hereinafter "play") the song "Mary Had a Little Lamb" and then say "Now you play it. Follow the lights." By playing the song before allowing the child to play the song, the timing of the song is demonstrated for the child. The device will then sequentially illuminate the finger indicators corresponding to the proper fingering that should be used when playing the song on a keyboard. In addition, electronic learning aid 1 will say the finger number of each finger to be pushed downward by the child and produce the corresponding note of the song "Mary Had a Little Lamb." More specifically, electronic learning aid 1 will say "Three, three, two, one, two, three, three, three, two, two, two, three, five, five, three, two, one, two, three, three, three, three, two, two, three, two, one." while illuminating corresponding finger indicators 111–115.

When the child successfully completes the song the device will say "That sounds great. Now let's play on the keys. Move your hand to the keys that are lit." At this point in time, keys 210*c–g* (corresponding to the musical notes "C, D, E, F and G", respectively) will be illuminated by LEDs D3–D7 to indicate to the child the placement of his right hand. Electronic learning aid 1 will then begin with a basic task and say "Follow the lights. One, two, three, four, five, five, four, three, two, one, one, two, three, four, five, five, four, three, two, one." while illuminating each key 210*a–g* in sequential order and producing the appropriate musical note as the child depresses each key.

After successfully completing this task, electronic learning aid 1 will then say "Let's play Mary Had a Little Lamb again. Listen. First I'll play it." at which time the device will play Mary Had a Little Lamb. Electronic learning aid 1 will then instruct the child to play the song by saying "Now you play it. Follow the lights." and will illuminate keys 210*c–g* that are to be depressed to play Mary Had a Little Lamb while simultaneously saying the finger number of the finger to be used to depress the key. Specifically, electronic learning aid 1 will say "Three, three, two, one, two, three, three, three, two, two, two, three, five, five, three, two, one, two, three, three, three, three, two, two, three, two, one." while illuminating the appropriate key 210*c–g*.

After completing this task, the device will randomly select a different song and task the child to follow the illuminated keys while saying the finger to be used to depress the key. The child will be tasked to successfully complete ten songs before this mode is finished at which time electronic learning aid 1 operate in Keys Two Mode. In a variation of the preferred embodiment, another exercise allows the child to play the song while illuminating the appropriate key 210, but not providing audible instructions as to the finger to be used.

Keys Two Mode

Pressing Keys Two Mode button 12 allows electronic learning aid 1 to enter the Keys Two Mode. When the device enters the Keys Two Mode, electronic learning aid 1 will say "Let's play the piano. Move your hand to the keys that are lit." at which time keys 210*c–g* will illuminate to indicate to the child the correct placement of the right hand. The device will continue by saying "Remember, each finger has a number. Your thumb is finger one. Your little finger is finger five. Each time a light is lit, press that finger down. As we play, I'll tell you the finger numbers. Okay, let's go. Follow the lights. Finger one." At this time, microcomputer 500 will illuminate key 210*c* to provide a visual indication along with the audible instruction to the child to push down finger one (his thumb). When microcomputer 500 detects the actuation of key 210*c*, electronic learning aid 1 will momentarily sound a "C" note through speaker 505, turn off (remove the illumination from) key 210*c*, and say "Finger two" and illuminate key 210*d*. Upon the successful actuation of key 210*d*, electronic learning aid 1 will sound a "D" note and move to finger three and so on until reaching finger five. After successfully actuating key 210*g* (corresponding to finger five and the "G"), electronic learning aid 1 will successively task the child to exercise each finger starting with finger five and descend from finger five down through finger one in this same manner and sounding the same notes ("C, D, E, F, and G) corresponding to keys 210*c–g*. After successfully completing this task, electronic learning aid 1 will say "Lets play it again."

The device will then have the child perform the exact same task of depressing each successive finger downward to actuate each successive key 210*c–g* in both ascending and then descending order. However instead of identifying the appropriate finger to be used as "Finger one" or "Finger two" as described above, electronic learning aid 1 simply says the number corresponding to the finger to be depressed.

For example, electronic learning aid 1 would simply say "One, two, three, four, five, five, four, three, two, one." as the child successfully actuated each key 210*c–g*. As above, each key 210*c–g* is also illuminated while electronic learning aid 1 says its associated finger number and each note is sounded upon the actuation of the respective key 210. After successfully completing this task, electronic learning aid 1 will audibly produce a reward phrase such as "Good job." followed by a transitory phrase such as "Let's try something new."

Electronic learning aid 1 will then say "One" and illuminate key 210*c*. The device will then wait for the actuation of key 210*c* and then produce a "C" and say "One" again while illuminating key 210*c*. After the child correctly depresses key 210*c* again, the device will sound a "C" note and again say "One" and illuminate key 210*c*. When the child depresses key 210*c* for the third time, electronic learning aid 1 will produce a "C" and say a reward phrase such as "That's great," followed by "Listen, you repeated the same note." Next, electronic learning aid 1 will move to finger two and say "Two, two, two" while illuminating key 210*d*. As the child actuates key 210*d* (corresponding to finger two) in response to each audible prompt, electronic learning aid 1 will sound a "D" note, which corresponds to key 210*d*. Electronic learning aid 1 will then move on to finger three and so on up through finger five. After successfully depressing key 210*g* three times, electronic learning aid 1 will say a reward phrase such as "Terrific." followed by a transitory phrase such as "Let's try the next one."

Electronic learning aid 1 will then similarly task the child to actuate combinations of fingers such as "Two, three, two, three, two, three, two." followed by "Two, four, two, four, two, four, two, four, two." and then "One, five, one, five, one, five, one, five, one." In each of these tasks, electronic learning aid 1 will illuminate the appropriate key, await actuation of that key, and sound the associated note before prompting the child for the next key.

After successful completion by the child, the device will task the child to play a song by saying "Let's play Mary Had a Little Lamb. First, I'll play it." Electronic learning aid 1 will then play the song "Mary Had a Little Lamb" and then say "Now you play it. Follow the lights." By playing the song before allowing the child to play the song, the timing of the song is demonstrated for the child. The device will then sequentially illuminate keys 210*c–g* in the appropriate order to properly play the song. In addition, electronic learning aid 1 will say the finger number of each finger to be pushed used by the child to depress the illuminated key and produce the corresponding note of the song "Mary Had a Little Lamb." More specifically, electronic learning aid 1 will say "Three, three, two, one, two, three, three, three, two, two, two, three, five, five, three, two, one, two, three, three, three, three, two, two, three, two, one." while producing the melody of Mary Had a Little Lamb as the child presses the correct keys 210*c–g*.

Up until this point in instruction, the child has not had to move his hand along the keyboard since the exercises and song played is appropriately played with the hand in fixed position with respect to the keyboard. In other words, the combinations of musical notes played have spanned only over five keys 210*c–g*. However, the next exercise requires the child to move his hand slightly.

Electronic learning aid 1 will task the child to use fingers one and five to depress keys 210*c* ("C") and 210*h* ("A"), respectively, which are five keys apart. For example, the device will say "Remember, follow the lights. One, five, one, five, one, five, one." while illuminating key 210*c* while saying each "one" and illuminating key 210*h* while saying each "five".

After successfully completing this task, electronic learning aid 1 will provide an exercise that tasks the child to move his hand even further. The device will say "Now let's learn something new. One, two, three." while illuminating the respective keys 210*c–e* and playing the respective notes ("C, D, and E") as the child depresses each key. Electronic learning aid 1 will then say "Thumb under. One, two, three, four, five." which instructs the child to move his thumb under the most recently used finger, which is finger three, to depress illuminated key 210*f* ("F"), and to the continue depressing keys 210*g–j* (notes "G, A, B, and C", respectively) (which are sequentially illuminated as the finger number is audibly produced) with fingers two through five. After completion, the child will have used five fingers to play a scale of eight notes on the keyboard corresponding to keys 210*c–j*. This exercise is repeated to ensure that the child has mastered this new skill.

Next, the child will be tasked to play a song that requires the use of this new skill. Specifically, electronic learning aid 1 will say "Let's play Twinkle Twinkle Little Star. Listen. First, I'll play it." after which the song will be played. By playing the song before allowing the child to play the song, the timing of the song is demonstrated for the child. The device will then say "Now you play it. Follow the lights. Use the right fingers." and then illuminate the correct keys 210*c–j* while saying the finger number of the finger to be used to depress the key.

After completing this task, the device will randomly select a different song and task the child to follow the illuminated keys while saying the finger number of the finger to be used to depress the key. If the child performs another song correctly, the child will be given the opportunity to decide which song to play. The device will say "To play another song, put in that card." As discussed above, microcomputer 500 will identify inserted card 400 by detecting the permutation of holes 405 along the bottom edge of card 400. This identification process can be accomplished by any suitable method such as correlating the various combinations of punched holes to memory addresses which correspond to a ROM table that stores the song data. After a card is inserted, electronic learning aid 1 will say "Let's play" followed by the name of the song and then "Listen. First I'll play it." at which time the song corresponding to the card will be played. The device will then task the child to play the song by saying "Now you play it. Follow the lights. Use the right fingers." which is followed by the illumination of the appropriate keys 210*a–l* and identification of the appropriate fingering as discussed above.

If the child completes this song, the child is prompted to select another song by inserting a different card. If the child does not remove the card within eight seconds, the device will say "Let's play" followed by the name of previous song "again." Should this occur, electronic learning aid 1 will not first play the song as above, but simply task the child to follow the indicators and play it himself.

Player Piano Mode

When Player Piano Mode button 13 is pressed, electronic learning aid 1 will enter the Player Piano Mode in which the device will play the song associated with the inserted card. The mode begins with electronic learning aid 1 saying "Put in a card. I'll play a song for you." After the child inserts a card, the device will say the name of the song and then play it. When the song is finished, electronic learning aid 1 prompts the child for another card by saying “To play another song, put in that card.”

Free Play Mode

When Free Play Mode button 14 is pressed, electronic learning aid 1 enters the free play mode which has two submodes. If a card 400 is inserted in card support 350 when Free Play Mode button 14 is actuated, then electronic learning aid 1 will illuminate the proper keys 210*a–l* to allow the child to play the song on inserted card 400.

If no card is inserted in card support 350 when Free Play Mode button 14 is actuated, then electronic learning aid 1 and keyboard assembly 200 act as a conventional electronic keyboard audibly producing the note corresponding to keys 210*a–l* that are depressed by the child.

Scroll Button

By actuating scroll button 15, the child can scroll through a number of instruments and sounds that can become the source of the tones in place of a piano. For example, the piano tones might be replaced by an organ, a flute, a dog barking, or horn blowing. This feature is accessible in Free Play Mode and Player Piano mode.

Other embodiments

While in the preferred embodiment of the present invention, the timing of the song is taught by terminating the production of each note as the song should be played, when the child holds the key or finger switch down too long. However, another method of teaching the timing would be to use indicators 111–115 (or similarly LEDs under keys 210*a–l*) which are multi-colored. For example, an indicator would illuminate green to indicate that a key or finger switch should be depressed, and illuminate red to indicate that the key or finger switch should be released. Similarly, a metronome could be provided to further illustrate timing. For example, a metronome which is constructed of a series of four LEDs might be horizontally positioned directly above hand pad 100 and controlled by microcomputer 500. Each LED would sequentially illuminate from left to right and then from right to left to simulate the movement of a metronome.

Although the indicators of the present inventions are LEDs, any suitable indicator such as conventional miniature light bulb would work equally as well. Furthermore, although the present invention has been described in the context of an electronic learning aid which teaches the child instruction as to the melody using the right hand, another embodiment employing the principles of the present invention could be constructed to teach an adult or child the use of the left hand in playing chords or melodies or could teach the student how to use both the right and left hands in playing musical instruments. Although the preferred embodiment provides instruction for the playing of the piano, the present invention is equally suitable for teach other keyboard instruments such as the organ.

What is claimed is:

1. An apparatus for teaching a user to play a musical instrument, comprising:

a hand-shaped pad having a palm portion and five finger portions and being sized and shaped to receive the user’s hand with one finger disposed in each of said finger portions;

an indicator associated with each of said finger portions;

an electronic circuit coupled to said indicators to selectively activate each of said indicators, activation of an indicator defining a selected finger portion and indicating to the user to move the user’s finger positioned in the selected finger portion; and an output device coupled to said electronic circuit, wherein said electronic circuit causes said output device to produce an output to indicate the finger to be moved by the user in said selected finger portion.

2. The apparatus of claim 1, further comprising:

an output device coupled to said electronic circuit;

an actuator disposed in each of said finger portions, positioned for actuation by movement of the user’s finger, and coupled to said electronic circuit;

said electronic circuit determining whether an actuator actuated by the user corresponds to the selected finger portion; and said electronic circuit causing said output device to output an error output when the user actuates an actuator not corresponding to the selected finger portion.

3. The apparatus of claim 2, wherein:

said electronic circuit causes said visual indicators to activate in a predetermined sequence prompting the user to actuate said actuators disposed in said associated finger portions in said sequence.

4. The apparatus of claim 3, wherein:

said electronic circuit determines whether said sequence of actuators corresponding to said sequence of activation of said visual indicators is actuated by the user and causes said output device to produce an output indicative of the correctness of the user’s actuation of said actuators.

5. The apparatus of claim 1, further comprising:

a keyboard assembly coupled to said electronic circuit and having a plurality of actuatable keys, each of said keys having an indicator associated therewith to selectively identify said key; and wherein said electronic circuit selectively causes said indicator to identify said keys to prompt the user to actuate said keys.

6. The apparatus of claim 5, wherein:

said electronic circuit selectively causes said keys to illuminate in a predetermined sequence prompting the user to actuate said keys in said same sequence.

7. The apparatus of claim 6, wherein said electronic circuit causes said output device to produce an output to indicate the finger to be used by the user to actuate said illuminated keys.

8. The apparatus of claim 5, wherein said electronic circuit causes said output device to produce an output to indicate the finger to be used by the user to actuate said identified keys.

9. An apparatus for teaching a user to play a musical, instruments comprising:

a housing;

a hand-shaped pad disposed on said housing, said hand-shaped pad having a palm portion and plurality of finger portions, each of said finger portions being sized and positioned to receive one of the user’s fingers;

an actuator disposed in each of said finger portions, each said actuator being positioned to be actuated by the user with the user’s finger without movement of the user’s hand when the user’s hand is disposed on said hand pad; and an indicator associated with each of said finger portions for indicating the actuator to be actuated and for indicating the finger to be used by the user to actuate said actuator.

10. The apparatus of claim 9, further comprising:

a keyboard assembly disposed in said housing, said keyboard having a plurality of actuatable keys, said keys being illuminatable; and an electronic circuit coupled to said keys for selectively illuminating said keys.

11. An apparatus for teaching a user to play a keyboard musical instrument, comprising:

a plurality of manual input devices, each of said manual input devices being positioned to be actuated by one of the five fingers of the user's hand;

an output device for providing an audible output; and an electronic circuit coupled to said manual input devices and said output device for causing said output device to produce an audible output to prompt the user to actuate one of said manual input devices, for indicating the finger to be used by the user to actuate said one of said manual input devices, and for determining whether the user actuated said one of said manual input devices.

12. The apparatus of claim 11, wherein said electronic circuit causes said output device to produce an output providing an indication as to the correctness of the user's actuation.

13. The apparatus of claim 11, further comprising:

a plurality of indicators, each of said indicators being associated with one of said manual input devices;

a hand-shaped pad having a palm portion and five finger portions each of said finger portions being sized and positioned to receive one of the user's fingers, and having one of said manual input devices disposed in each of said five finger portions; and electronic circuit causing said indicators to activate to indicate to the user the manual input device to be actuated.

14. A method for teaching a user to play a musical instrument, comprising the steps of:

providing a hand-shaped pad having a palm portion and five finger portions and being sized and shaped to receive the user's hand, such that when the user's hand is placed on the hand-shaped pad each of the user's fingers is disposed within a corresponding finger portion;

providing a plurality of finger switches in said hand pad and positioned to be actuated by the user's fingers;

providing an associated indicator with each of said finger switches;

activating an indicator to prompt the user to actuate said associated finger switch; and providing an audible output to indicate the finder of the user to be used to actuate said finger switch.

15. The method of claim 14, further comprising the steps of:

determining whether the user has actuated said finger switch associated with said activated indicator; and providing an error output when the user actuates a finger switch not associated with said activated indicator.

16. The method of claim 15, further comprising the steps of:

providing an audible output to prompt the user to actuate said finger switch associated with said activated indicator.

17. A method for teaching a user to play a keyboard musical instrument, comprising the steps of:

providing a keyboard having a plurality of actuatable, illuminatable keys;

selectively illuminating said keys of said keyboard to indicate to the user which of said keys to be actuated; and providing an audible output to indicate the finger of the user to be used to actuate said illuminated key.

* * * * *